United States Patent [19]

Reich et al.

[11] Patent Number: 5,128,979
[45] Date of Patent: Jul. 7, 1992

[54] MONITORED PERSONAL EMERGENCY RESPONSE SYSTEM

[75] Inventors: Richard M. Reich, Westwood; Philip H. Devlin, Brookline, both of Mass.

[73] Assignee: Lifeline Systems Inc., Watertown, Mass.

[21] Appl. No.: 651,129

[22] Filed: Feb. 6, 1991

[51] Int. Cl.$^5$ .................................... H04M 11/04
[52] U.S. Cl. .................................... 379/40; 379/38; 379/39; 379/41; 379/42
[58] Field of Search ................. 379/40, 38, 39, 41, 379/42, 43

[56] References Cited

U.S. PATENT DOCUMENTS

| | | | |
|---|---|---|---|
| 3,846,783 | 11/1974 | Apsell et al. | 379/38 |
| 3,914,692 | 10/1975 | Seaborn, Jr. | 379/38 |
| 4,064,368 | 12/1977 | Dibner | 379/38 |
| 4,371,751 | 2/1983 | Hilligoss, Jr. et al. | 379/42 |
| 4,510,350 | 4/1985 | Wagner et al. | 379/38 |
| 4,521,645 | 6/1985 | Carroll | 379/42 |
| 4,524,243 | 6/1985 | Shapiro | 379/38 |
| 4,565,902 | 1/1986 | Phillips | 379/38 |
| 4,652,859 | 3/1987 | Van Wienen | 379/40 |
| 4,856,047 | 8/1989 | Saunders | 379/41 |
| 4,868,859 | 9/1989 | Sheffer | 379/39 |
| 4,893,324 | 1/1990 | Slown | 379/40 |
| 4,993,059 | 2/1991 | Smith et al. | 379/39 |

Primary Examiner—James L. Dwyer
Assistant Examiner—Stella L. Woo
Attorney, Agent, or Firm—Weingarten, Schurgin, Gagnebin & Hayes

[57] ABSTRACT

A personal emergency response system (PERS) is disclosed which includes a method and apparatus for monitoring alarm signals to provide improved emergency response capabilities and enhanced system operability. The system includes a local response center for relaying alarm signals received from subscribers to mobile on-site field personnel via individual paging units. The system is also capable of retransmitting an alarm signal in the event that a response to the original alarm signal has not been registered within a predetermined period of time. The system is also provided with redundant communications paths to minimize the possibility of a missed alarm message from a subscriber, and self-test capabilities for detecting system faults and transmitting fault messages to the individual paging units of the system.

14 Claims, 3 Drawing Sheets

MONITORED PERSONAL EMERGENCY RESPONSE SYSTEM

FIELD OF THE INVENTION

This invention relates generally to personal emergency response systems and, more specifically, to a method and apparatus for monitoring the response activity and operability of a personal emergency response system.

BACKGROUND OF THE INVENTION

Personal emergency response systems (PERS) are generally known and have proven to be an effective tool for monitoring the condition of and responding to the needs of elderly and/or infirm persons confined to their residences or other facilities. A typical personal emergency response system is shown in U.S. Pat. No. 4,064,368 of the same assignee, which includes at least one subscriber unit located at a subscriber site for transmitting an alarm signal containing subscriber identification and alarm-type information via a telephonic communication link to a remote monitoring station capable of receiving alarm signals from multiple subscribers. Upon receipt of an alarm signal at the monitoring station, an operator dispatches assistance to the subscriber's site or initiates other appropriate action.

Personal emergency response systems of the type described above are often utilized at multi-residence sites such as apartment complexes, nursing homes, and retirement communities, as well as other multi-residential developments. In such applications, it would be beneficial to configure the system into a localized network including a local response center having potentially mobile on-site personnel for monitoring alarm signals to provide improved emergency response capabilities and enhanced system operability.

A monitored personal emergency response system as described, requires enhanced communications flexibility to meet specific site requirements as well as to instill user confidence. For example, it is important to provide reliable communication of alarm signals from subscribers to potentially mobile on-site field personnel throughout the multi-residential development, even during periods when the local response center is left unattended, as for example when a local response center operator is making rounds or responding to another call. For most applications, it would be important to provide communications redundancy for retransmitting alarm signals to the same or to backup field personnel in the event that a response to the original alarm signal has not been registered within a predetermined period of time. Further, it would be useful to provide a system self-testing capability in order to alert field personnel of a fault in the operability of the system.

The present invention provides a locally monitored personal emergency response system that addresses the issues discussed hereinabove.

SUMMARY OF THE INVENTION

The present invention provides a monitored personal emergency response system (PERS) including a local response center coupled to one or more individual paging units for relaying alarm signals from subscribers to mobile on-site field personnel utilizing a redundant communication protocol and system self-test capabilities to provide reliable enhanced communications. Accordingly, a method and apparatus for locally monitoring a personal emergency response system is herein disclosed, including a system for transmitting an alarm signal from a subscriber unit to a local response center and for selectively relaying the received alarm signal to on-site field personnel via one or more individual paging receiver units. The locally monitored PERS of the present invention includes at least one subscriber unit coupled via a telephonic communication link to a local response center for monitoring alarm calls from subscribers, and further includes one or more individual paging units coupled via a radio frequency communication link to the response center for receiving relayed alarm messages at an on-site location remote from the response center.

In operation, a subscriber unit activated by a subscriber will transmit an alarm signal containing subscriber identification information and alarm-type information over a telephonic communication link to the response center whereupon assistance may be dispatched to the subscriber's residence either directly from the response center or through on-site field personnel, paged and notified of the alarm situation via an individual paging unit. The local response center can relay alarm messages to individual paging units either manually, via a response center operator, or automatically, through a control unit located at the local response center. The control unit provides means for automatically relaying the alarm signal to one or more selected paging units even in the event that the response center is left unattended. Fault messages can also be relayed by the response center to the one or more paging units to alert personnel to system failures so that remedial action can be pursued in timely fashion.

The invention also features means for automatically providing reminder messages at the response center and for sending such reminder messages to one or more paging units, in the event that a response to the original alarm signal is not indicated within a selected time period. Successive reminder messages can be provided at selected intervals and can be transmitted to primary and backup paging units for redundancy of communications and to increase the opportunity of response to an alarm condition.

The present invention also includes means for self-testing the operability of the PERS, including means for notifying response center personnel that a system fault exists in the operational capabilities of the system. The system self-test mode includes means for transmitting test signals to the individual paging units at predesignated times such that the absence of a predesignated test signal at an individual paging unit is representative of a fault between the response center and the paging unit.

DESCRIPTION OF THE DRAWINGS

Other features and advantages of the invention will be apparent from the following description in conjunction with the accompanying drawings in which.

DETAILED DESCRIPTION OF THE INVENTION

Figure 1:
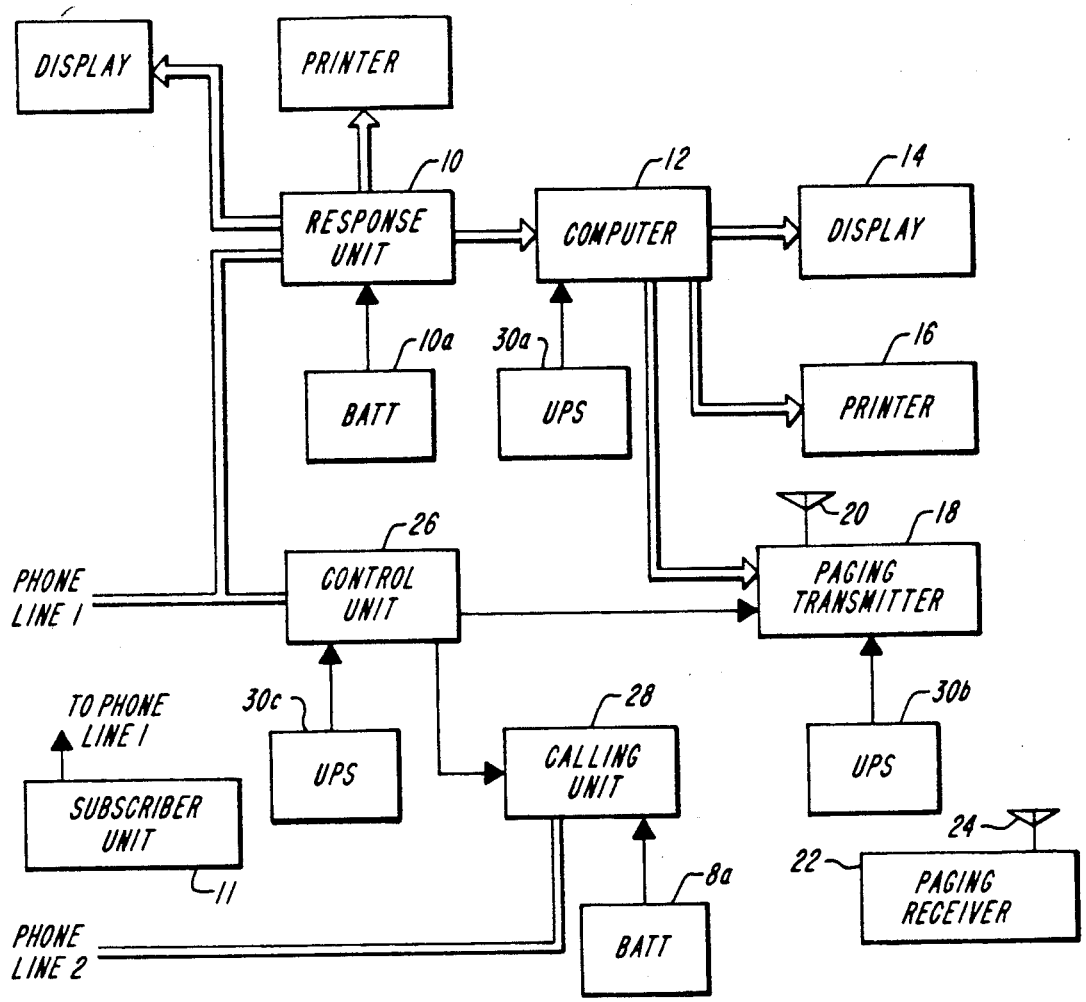
FIG. 1 is a block diagram of the system at the response center and embodying the present invention.
Figure 2:
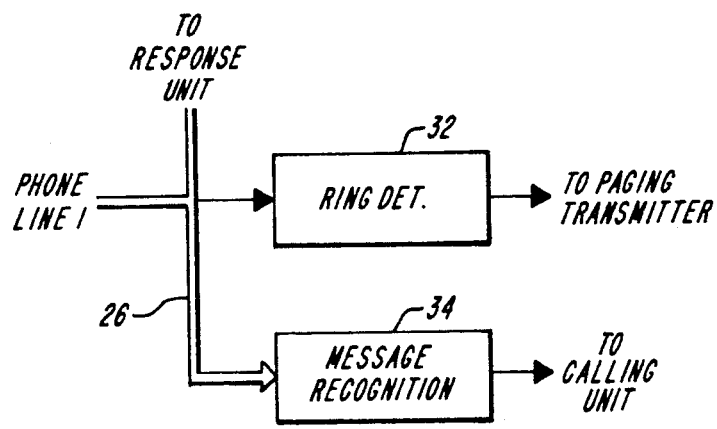
FIG. 2 is a block diagram of the control unit of FIG. 1.

The invention is typically employed in a personal emergency response system (PERS) at a multi-subscriber facility such as a nursing home, retirement community, or apartment house. A response center is located typically, but not necessarily, at the facility and each subscriber can communicate with the response center by activation of a subscriber unit 11 by means of a HELP button located on the unit or by a portable HELP button carried by the subscriber which communicates by radio link to the subscriber unit. The system of FIG. 1 is located at the response center and comprises a response unit 10 coupled to a phone line, labeled: phone line 1, and also coupled to a computer 12, which typically includes an associated display 14 and printer 16. The response unit may include an integral display and printer as shown. The computer 12 is also coupled to a paging transmitter 18, which includes an antenna 20. The paging transmitter and associated antenna provide paging signals to one or more paging receiver units 22, each of which includes a respective receiving antenna 24. A control unit 26 is also coupled to phone line 1 and provides output signals to the paging transmitter 18 and to a calling unit 28 which is coupled to a separate phone line labeled phone line 2. The control unit 26 is shown more particularly in FIG. 2 and includes a ring detector 32, which provides actuating signals to paging transmitter 18, and a message-recognition unit 34, which provides actuating signals to calling unit 28. The transmitter 18 and paging units 22 can be standard pocket paging apparatus which per se is known. The units 22 are of the type having a display for showing visual messages, as well as an audible or other indicator to denote message receipt.

The response unit 10 usually includes a backup battery power source 10a for powering of this unit in the event of main power failure. A battery backup unit 28a is also associated with calling unit 28 for similar power backup purposes. The computer 12, paging transmitter 18 and control unit 26 are preferably powered by uninterruptable power sources 30a, 30b and 30c, which may be individual power supplies or one uninterruptable power supply. As is well known, such uninterruptable power sources provide a period of backup power in the event of main power failure to permit the associated devices to remain powered for a period of time, and so prevent an immediate interruption of system operation.

The response center is typically staffed by on-site personnel, one or more of which are equipped with an individual paging receiver unit 22. The paging units allow the personnel to be mobile and to be contacted within the facility in the event of alarm or fault conditions. Thus the personnel need not remain at the response center to receive critical messages, as such messages can be relayed to such personnel in accordance with the operation of the invention.

The response unit 10, computer 12, associated display 14, and printer 16 are the usual constituents of a PERS remote monitoring station and operate in known manner for receiving incoming calls, decoding alarm messages and identifying the calling subscriber, so that help can be efficiently dispatched. The computer 12 includes appropriate software for system operation and control. The software typically provides a data base of specific data pertaining to each resident of the living facility including name, sex, age, address and telephone number. The control unit 26, calling unit 28, paging transmitter 18 and paging receiver units 22 comprise the apparatus of the present invention, which are cooperative with the other constituent units, as shown in FIG. 1, to provide the enhanced performance and operability of the invention.

Each subscriber unit when activated by a subscriber initiates a call to the response center by dialing a predetermined telephone number and initiates the transmission of an alarm message to the response center. After message transmission, the subscriber unit enters into a "WAITING FOR RESET" state, in which a preset internal timer provides a selected timer period of typically thirty (30) minutes. If the reset button on the subscriber unit is activated before the timer interval ends, a message is transmitted by the subscriber unit to the response center which identifies the subscriber and indicates that the subscriber unit has been reset. The subscriber unit then returns to its normal ready state for activation by the subscriber. If the reset button on the subscriber unit is not activated during the timer interval, a "HELP STILL NEEDED" message is automatically initiated by the subscriber unit and transmitted to the response center. The interval timer is reset to the selected interval, in this example thirty (30) minutes, and the subscriber unit again enters a "WAITING FOR RESET" state. At the end of each timing interval, the "HELP STILL NEEDED" message will be sent to the response center to denote that the subscriber unit has not yet been reset. The subscriber unit can be constructed to provide a predetermined number of repetitive "HELP STILL NEEDED" message transmissions. Alternatively, the subscriber unit can be programmable to select an intended, repetitive cycle.

The response unit 10 responds to each detected ring signal and is operative to monitor/validate and decode messages received via the incoming call from a subscriber unit. The response unit 10 typically includes a visual display for display of incoming messages and a paper tape or other suitable printer for hard-copy printout of received message data. Decoded messages are provided by response unit 10 to computer 12, which provides logging of received data to maintain a history of alarm and fault messages received from each of the subscribers, and the output of which can be displayed as desireable on display 14, or a printed record provided via printer 16. Alarm and fault messages are also conveyed from computer 12 to paging transmitter 18 for conveyance of such messages to the remote paging receiver units 22 for display to the users of the paging receivers.

Figure 3:
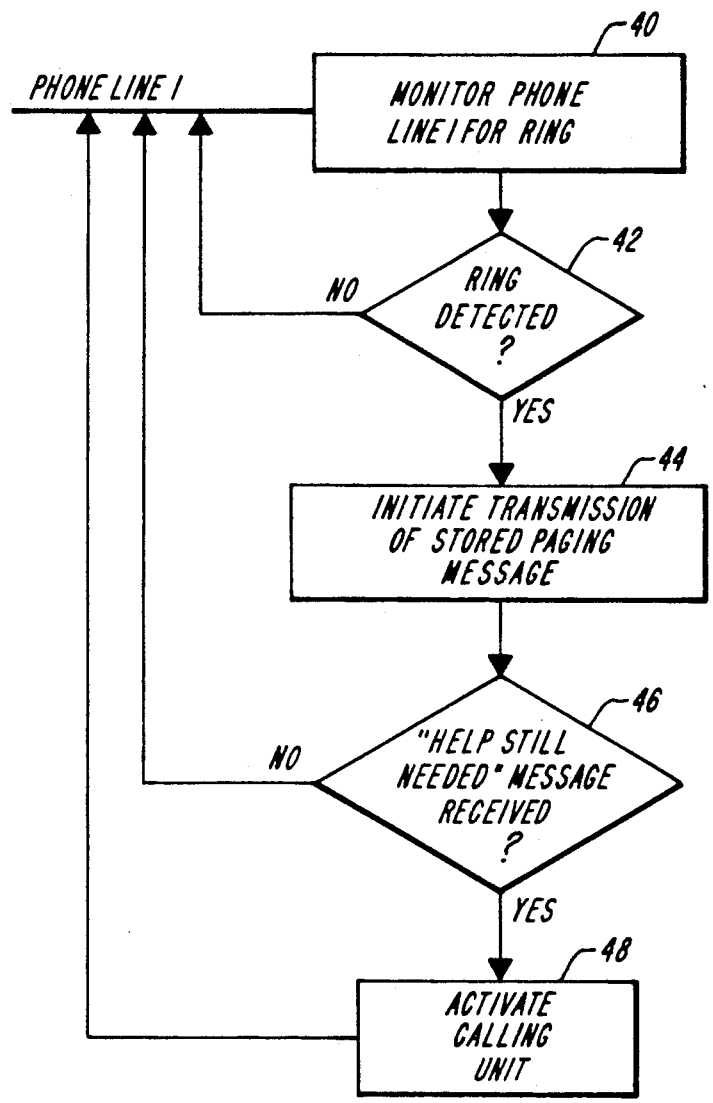
FIG. 3 is a flow chart illustrating the operation of the system of FIG. 1.

The operation of the system of FIG. 1 will be discussed in conjunction with the flow chart of FIG. 3. Phone line 1 is monitored by control unit 26 to detect a ring signal (step 40). If no ring signal is detected, the control unit continues to monitor the telephone line as indicated in step 40 and decision block 42. If a ring signal is detected, the controlled unit 26 initiates transmission of a stored paging message, as depicted in step 44. The stored paging message is typically stored in non-volatile memory in the paging transmitter. Such stored paging message transmission is initiated by control unit 26 providing an actuating signal to paging transmitter 18, which is operative in response to such actuation to provide the stored paging message to the one or more paging receiver units 22.

The paging receiver units 22 indicate receipt of a message by a suitable audible, visual or other well known indication, and provide display of the stored paging message, which may be "INCOMING ALARM" to denote to the attendant that an incoming alarm has been received. As denoted in block 46, the control unit 26 monitors the incoming messages to detect a "HELP STILL NEEDED" message, which will be transmitted by the subscriber unit if that unit is not reset within a predetermined time interval after actuation of the unit to send an alarm message. The subscriber unit reset is performed at the subscriber's residence by physically actuating a reset control on the subscriber unit. If this "HELP STILL NEEDED" message is not received, the control unit 26 returns to the task of monitoring the phone line for an incoming ring signal (step 40).

If the "HELP STILL NEEDED" message is received, the control unit 26 provides an actuating signal to calling unit 28, as indicated in step 48. In response to such actuation, the calling unit 28 is operative to dial a predetermined number on phone line 2 to provide communication with a remote response center or central monitoring center and to provide a message to the dialed center that help is needed at the designated facility being monitored. The identity of the individual subscriber is not usually known in this instance, and thus only the identification of the facility at which help is needed is identified to the remote response center, so that personnel at that remote response center can investigate and take appropriate remedial action.

It will be appreciated that more than a single phone line can be monitored by the system of FIG. 1. For convenience, only phone line 1 is shown as an incoming line being monitored, whereas in actuality plural lines may be monitored to provide available non-busy lines in the event of simultaneous or overlapping incoming alarm calls.

Figure 4:
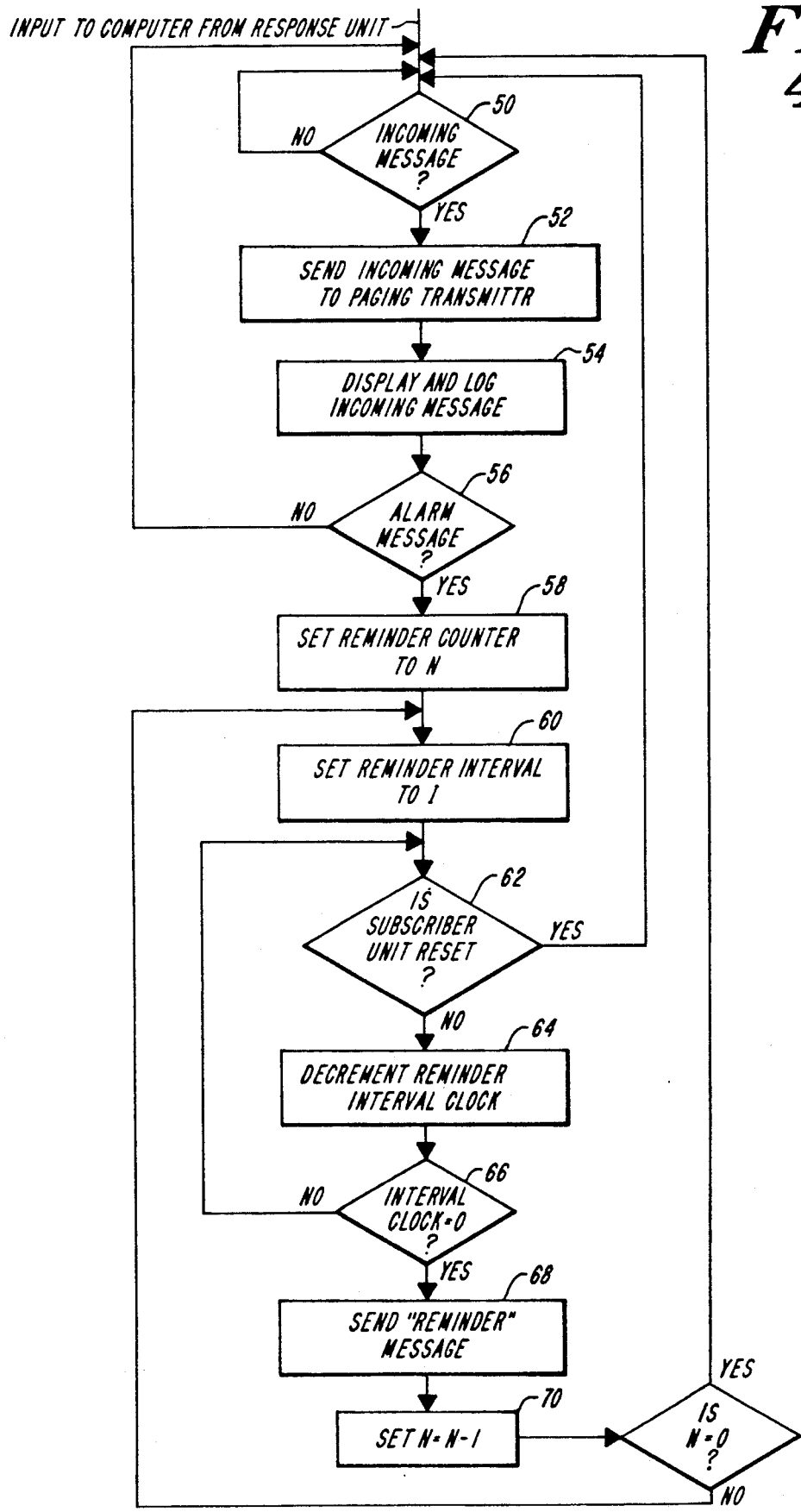
FIG. 4 is a flow chart further illustrating the operation of the system of FIG. 1.

The operation of the system is further explained in conjunction with the flow chart of FIG. 4. If the response unit 10 receives an incoming message (block 50), the response unit commands the computer 12 to send the incoming message to paging transmitter 18, as depicted in step 52. The computer also displays and logs the incoming message (step 54). The computer software also detects whether the incoming message is an alarm message, which is any of several predetermined messages which are to be sent to the one or more remote paging receivers. Typical alarm messages are HELP NEEDED, INACTIVITY ALARM, SMOKE ALARM, FIRE ALARM and TEMPERATURE ALARM. Other types of alarms may be received as respective incoming messages, such as LOW BATTERY ALARM, but are not designated as alarm messages. If an alarm message is detected (block 56), a reminder counter in computer 12 is set to a value N, and a reminder interval is set in computer 12 to a time value I. N is equal to the maximum number of reminder messages to be conveyed to the paging receivers, while the reminder interval is the defined time period following which a reminder message is sent to the paging receiver. As an example in the present illustration, N is equal to 2 and the interval I is equal to 10 minutes.

The computer software then detects whether the incoming message is a RESET from the subscriber unit (block 62). If a RESET signal is received, the computer software returns to an initial condition to await a new incoming message. If a RESET signal is not received, the reminder interval clock is decremented (step 64), and if the interval clock is not at its zero count, the response unit again determines whether a RESET signal has been received. This loop operation continues, if no RESET signal is received, until the interval clock is at its zero state, at which time computer 12 sends a reminder message (step 68), to paging transmitter 18 for transmission of that reminder message to the paging receiver. The reminder counter is decremented (step 70), and if N is equal to zero, the system returns to its initial condition to monitor the receipt of subsequent incoming messages. If N is not equal to zero, the system branches to cycle through another reminder interval.

If at the conclusion of the first 10-minute reminder interval, a RESET message is not received, a reminder message containing the substance of the last received alarm message is directed to a selected primary paging receiver unit 22. If, after a subsequent 10-minute reminder interval, a RESET signal has not been received, a reminder message is sent to the primary remote paging receiver unit 22 and to a predetermined backup paging receiver to provide additional redundant receipt of the reminder message in the event that the first paging receiver is not operative or the attendant is not responding to the reminder message.

After the first reminder interval, a typical reminder paging message can be "10 MINUTES ! RESET NOT RECEIVED. JOE JONES ROOM 304 PHONE 923-4141". The identification of the subscriber and his room and phone number are derived from the database stored in the computer. A typical reminder paging message after the second reminder interval can be as follows: "20 MINUTES! LAST REMINDER! RESET NOT RECEIVED. JOE JONES ROOM 304 PHONE 923-4141". The receipt of a RESET signal will interrupt the reminder message cycling, as indicated at decision block 62, to provide recycling of the system to its initial message waiting state.

For each incoming call received, the paging transmitter 18 is activated to transmit the stored message to the paging receiver, such as the "INCOMING ALARM" message. This message will be received at the paging receiver, even if the response unit 10 or computer 12 or communication lines interconnecting these units or interconnecting the computer and the paging transmitter or the response unit and the incoming phone line to the response unit are inoperative or faulty. Thus a level of redundancy is provided to assure that at least the "INCOMING ALARM" message is conveyed to the paging receiver to alert the attendant that an alarm message has been received. The "INCOMING ALARM" message is a default message which is provided even if the system is unable to provide conveyance of the actual alarm message.

The system also features a self test protocol to enhance operability and minimize the possibility of a missed alarm message. The response unit 10 provides a number of internally generated fault messages which typically include "NO POWER" to indicate a failure of primary power, "PHONE LINE PROBLEM" to indicate a problem in the phone line between the response unit 10 and the phone company local office, the so-called subscriber loop of a telephone network, and "INTERNAL EQUIPMENT FAILURE" to denote one or more faults in system components. The receipt at the paging receiver of an "INCOMING ALARM" message with no follow-up actual alarm message is an indication of a fault condition, which must then be investigated by the attendant carrying the paging receiver. In the event of a failure in control unit 26 or the link between this unit and paging transmitter 18, the alarm or fault message conveyed via response unit 10 and computer 12 to the paging transmitter will be received by the paging receiver without receipt of the "INCOMING ALARM" message which would normally be provided by the control unit 26. The absence of the "INCOMING ALARM" message will denote system failure in the control unit and/or its associated interconnecting lines.

In the event of a dead incoming phone line 1 or phone line 2 connection, a fault message is sent by the computer to the paging transmitter for conveyance of an appropriate fault message to the paging receiver(s).

A periodic test signal is also provided under the command of the computer 12 by paging transmitter 18 at predetermined time intervals such that at those predetermined times the paging units 22 will receive the test message. For example, a test message may be transmitted each hour to the paging units. The attendant carrying a paging unit will expect the test message at the predetermined time, and the absence of such a message will be indicative of a system fault to be investigated and corrected. In the event of a failure of the paging transmitter, the computer or linkage therebetween, the remote paging receiver, or receivers, will fail to receive the periodic test messages normally provided, and this failure will be noted by the attendant(s) carrying the paging receiver(s) so that investigative action can be taken.

Thus, the system of the invention provides multiple paths of message and signal transfer to minimize the opportunity for an undetected alarm or fault condition.

The present invention is illustrative of a novel method and apparatus providing monitoring of response activity and system operability of a PERS for responding to the needs of infirm or otherwise incapacitated individuals in a multi-residence or similar facility. It will be appreciated that modifications, alternative embodiments and implementations can be made without departing from the spirit and true scope of the invention disclosed herein. Accordingly, the invention is not to be limited and is to embrace the full permissible scope of the appended claims.

What is claimed is:

1. A monitored personal emergency response system comprising:
   a response unit operative to receive and decode alarm messages from one or more subscriber units via a first communication link;
   a computer means operative in response to decoded alarm messages from the response unit to provide corresponding output alarm signals;
   a paging transmitter operative in response to the output alarm signals from the computer means to transmit predetermined alarm messages to one or more remote paging receiver units operative to denote and display the received predetermined alarm messages;
   a control unit operative in response to alarm messages received from the one or more subscriber units via the first communication link to provide output signals indicative of received alarm messages;
   the paging transmitter being operative in response to the output signals from the control unit for transmitting a predetermined paging message to the one or more remote paging receiver units;
   a calling unit operative in response to the output signals from the control unit indicative of receipt by the control unit of an alarm message from a subscriber unit to direct a supplemental alarm message to a predetermined remote response center;
   wherein the control unit and the paging transmitter are operative to provide the predetermined alarm message to the one or more remote paging receiver units, even when the response unit or the computer means or both the response unit and the computer means are not operative to provide decoded alarm messages.

2. The system of claim 1 wherein the calling unit is operative to direct the supplemental alarm message to a predetermined remote response center when the alarm message received at the control unit from the subcriber unit is received after a predetermined period of time from receipt of a previous alarm message.

3. The system of claim 1 wherein the computer means is operative at predetermined time intervals to provide test messages to the paging transmitter for transmission of test messages to the paging receiver units.

4. The system of claim 1 wherein said response unit, computer means, control unit and paging transmitter include:
   an electrical power source for providing backup power in the event of a power failure.

5. The system of claim 1 wherein the computer means, upon detection of a decoded alarm message of a predetermined type is set in a reminder mode to provide predetermined reminder messages to the paging transmitter.

6. The system of claim 5 wherein the computer means is operative in response to a decoded reset signal received from a subscriber unit via the response means to return to an initial condition to await receipt of a subsequent decoded alarm message.

7. The system of claim 5 wherein the computer means is operative to provide a first reminder message to the paging transmitter for transmission of the first reminder message to a first selected paging receiver unit, and is operative to provide a second reminder message to the paging transmitter for transmission of the second reminder message to the first selected paging receiver and to a second selected paging receiver unit.

8. A monitored personal emergency response system comprising:
   a response unit operative to receive and decode alarm messages from one or more subscriber units via a first communication link;
   a computer means operative in response to decoded alarm messages from the response unit to provide corresponding output alarm signals;
   a paging transmitter operative in response to the output alarm signals from the computer means to transmit predetermined alarm message to one or more remote paging receiver units operative to denote and display the received predetermined alarm messages;
   a control unit operative in response to alarm messages received from the one or more subscriber units via the first communication link to provide output signals indicative of received alarm messages;
   the paging transmitter being operative in response to the output signals from the control unit for transmitting a predetermined paging message to the one or more remote paging receiver units;
   a calling unit operative in response to the output signals from the control unit indicative of receipt by the control unit of an alarm message from a subscriber unit to direct a supplemental alarm message to a predetermined remote response center;

wherein the response unit and the computer means are operative to provide decoded alarm signals to the paging transmitter for transmission to the one more remote paging receiver units even when the control unit is not operative to provide output signals.

9. The system of claim 8 wherein the calling unit is operative to direct the supplemental alarm message to a predetermined remote response center when the alarm message received at the control unit from the subscriber unit is received after a predetermined period of time from receipt of a previous alarm message.

10. The system of claim 8 wherein the computer means is operative at predetermined time intervals to provide test messages to the paging transmitter for transmission of test messages to the paging receiver means.

11. The system of claim 8 wherein said response unit, computer means, control unit and paging transmitter include:

an electrical power source for providing backup power in the event of a power failure.

12. The system of claim 8 wherein the computer means, upon detection of a decoded alarm message of a predetermined type, is set in a reminder mode to provide predetermined reminder messages to the paging transmitter.

13. The system of claim 12 wherein the computer means is operative in response to a decoded reset signal received from the one or more subscriber units via the response unit to return to an initial condition to await receipt of a subsequent decoded alarm message.

14. The system of claim 12 wherein the computer means is operative to provide a first reminder message to the paging transmitter for transmission of the first reminder message to a first selected paging receiver unit, and is operative to provide a second reminder message to the paging transmitter for transmission of the second reminder message to the first selected paging receiver and to a second selected paging receiver unit.

* * * * *